(12) United States Patent
Burns

(10) Patent No.: US 6,393,362 B1
(45) Date of Patent: May 21, 2002

(54) DYNAMIC SAFETY ENVELOPE FOR AUTONOMOUS-VEHICLE COLLISION AVOIDANCE SYSTEM

(75) Inventor: Ray L. Burns, St. David, AZ (US)

(73) Assignee: Modular Mining Systems, Inc.

( * ) Notice: Subject to any disclaimer, the term of this patent is extended or adjusted under 35 U.S.C. 154(b) by 0 days.

(21) Appl. No.: 09/521,436

(22) Filed: Mar. 7, 2000

(51) Int. Cl.$^7$ .......................... G01S 5/00; G01S 13/00; G06F 7/00; G06F 17/00; G06F 19/00

(52) U.S. Cl. ................ 701/301; 701/117; 701/119–122; 701/200–203; 701/206–210; 340/940; 340/988; 340/990; 340/995; 342/29; 342/357.13; 342/455; 342/457; 342/463

(58) Field of Search .......................... 701/117, 120–122, 701/119, 200–203, 206–210; 340/940, 988, 990, 995; 342/29, 357.13, 455, 457, 463

(56) References Cited

U.S. PATENT DOCUMENTS

| | | | | |
|---|---|---|---|---|
| 5,390,125 | A | * 2/1995 | Sennott et al. | 364/449 |
| 5,999,865 | A | * 12/1999 | Bloomquist et al. | 701/25 |
| 6,006,158 | A | * 12/1999 | Pilley et al. | 701/120 |
| 6,009,359 | A | * 12/1999 | El-Hakim et al. | 701/28 |
| 6,064,939 | A | * 5/2000 | Nishida et al. | 701/120 |

* cited by examiner

Primary Examiner—William A. Cuchlinski, Jr.
Assistant Examiner—Ronnie Mancho
(74) Attorney, Agent, or Firm—Antonio R. Durando; Durnado Birdwell & Janke, P.L.C.

(57) ABSTRACT

The function of each autonomous vehicle in a surface mine is performed according to a predetermined trajectory related to its particular task and implemented by a guidance system through on-board GPS and two-way communication hardware. The current position of the vehicle is continuously monitored and correlated to the position of potential hazards along its path, so that corrective action can be taken by implementing appropriate, predetermined control strategies. Each vehicle is assigned a safety envelope that accounts for the vehicle's physical presence and operating tolerances. The safety envelope is characteristic of each vehicle and is defined by a variable space surrounding the vehicle wherein it may be physically present as it travels along its intended trajectory. The shape and size of the safety envelope is dynamically varied to meet safety requirements for current trajectory conditions facing the vehicle as it performs its autonomous function along its predetermined path. The safety envelope is changed according to a predetermined set of rules specific to the vehicle. Intersections between predetermined vehicle trajectories along paths and roadways within the mine's property are identified dynamically by monitoring current traffic conditions and establishing locations where the safety envelopes of vehicles traveling along approaching trajectories could overlap.

26 Claims, 8 Drawing Sheets

DYNAMIC SAFETY ENVELOPE FOR AUTONOMOUS-VEHICLE COLLISION AVOIDANCE SYSTEM

BACKGROUND OF THE INVENTION

1. Field of the Invention

This invention is related in general to autonomous vehicles and other equipment operating in a surface facility and, in particular, to a method for establishing a potential zone of operational presence for each autonomous component in the system to ensure safety and efficiency.

2. Description of the Related Art

Traffic of manned or autonomous vehicles in a system is normally controlled by tracking the position of each moving component in the system and by communicating with each vehicle, either from a central location, from a peripheral position, or directly from other vehicles, to guide the vehicle safely along a desirable course. The worldwide air-traffic control system is a good example of such an approach. The position of each airplane is continuously monitored by one of many air-traffic control centers that is also in constant communication with the airplane in order to alert its crew of any impending danger or other situation deserving of attention. When the aircraft is unmanned, the communication includes control signals to an on-board computer that controls the flight of the craft through appropriate software and electronic and mechanical hardware. That is how an unmanned spacecraft is guided in flight. Thus, for the purposes of this disclosure, the term "autonomous" is intended to refer to the availability of either on-board or off-board supervisory systems for controlling the movement of a vehicle.

Autonomous vehicles in a surface mine operation can be similarly monitored and controlled by a central or satellite center transmitting control signals to the vehicle's on-board computer based on current mine conditions and in response to position data communicated by the vehicle. Alternatively, the vehicles's own on-board computer can produce appropriate control signals to the vehicle as a function of its position and additional information received from external components of the guidance system. Knowing the current position of the vehicle with respect to known fixed obstacles and other mine equipment, the vehicle can be maneuvered to destination by the continuous control of its operating functions (for example, steering-wheel, accelerator and brake position of a truck). An on-board satellite-based positioning system (such as GPS) or an equivalent positioning unit (either of which can be supplemented with an inertial navigation system or the like) can be used to determine the current position of the vehicle, with an on-board transmitter/receiver unit to communicate with the control center, and on-board microprocessing and storage modules with appropriate hardware and software can also be used to effect the actual movement of the vehicle. Every operating function is manipulated to cause the vehicle to follow a predetermined trajectory or a set of alternative trajectories that can be modified by current control instructions to meet particular up-to-date traffic conditions. Hazards are avoided by implementing a predetermined control response when a hazard is identified by the system. For example, if a potential obstacle is detected within a certain distance of the vehicle being monitored, the path of the vehicle is modified to avoid collision.

This traffic control approach is effective for systems operating at near steady state most of the time, such as in the case of airplanes that follow predetermined flight paths from a starting point to destination. When rapidly changing conditions exist, though, such as within the traffic of a surface mine where multiple vehicles and other equipment cross paths and change direction and speed as required to perform multifaceted functions and to meet continuously changing optimal mine-operation alternatives, a rigid, strictly reactive system of accident prevention is not adequate. A larger degree of flexibility is required to distinguish between different kinds of hazards. For example, while an unidentified obstacle approaching a vehicle traveling at 30 miles per hour along a predetermined path on a mine road may warrant the immediate stoppage of the vehicle, the approaching of a known potential obstacle, such as another vehicle traveling in the opposite direction, may only require a reduction in speed and an additional precautionary adjustment, such as a shift to the appropriate side of the roadway. Accordingly, a more flexible, dynamic approach is required. This invention is a component of such a new approach to mine traffic and safety control, an approach that provides a dynamic response through the implementation of various novel control concepts.

Surface mines utilize a variety of work machines for excavating and transporting ore, grading and stabilizing roadways and slopes in the mine pit, and for providing all support functions necessary for the operation of a mine. Most work and haulage machines have been human-operated, mobile pieces of equipment constantly being moved around the surface of the mine. Skilled operators ensure that each machine or vehicle is positioned in the right place and optimally oriented to perform its intended function while avoiding accidents and injury to people and property. In order to improve efficiency, much effort is currently under way to develop automated systems for controlling the operation of such work machines in surface mines and other environments. Therefore, this invention is described in the context of a surface mine operation, but its concept is applicable to any operation involving moving equipment (such as at waste sites and in underground mining, or in digging, shipping, trucking, and automotive operations) and should not be understood to be limited to surface mines.

BRIEF SUMMARY OF THE INVENTION

The primary objective of this invention is a safety monitoring and control system for ensuring the avoidance of hazards by all moving vehicles and equipment operating in a surface mine.

Another objective is an approach that permits the dynamic adaptation of a set of safety control rules to current circumstances facing a moving vehicle in a mine.

Another goal of the invention is a system that detects potential collision hazards in the path of an autonomous vehicle and effects an emergency stop when the vehicle travels in an otherwise unavoidable collision course.

Still another objective is a hazard avoidance system that utilizes apparatus suitable for implementation as a removable module for each autonomous vehicle in a multi-vehicle operation, particularly a surface mine.

Another goal is a system that is suitable for automated implementation with current surface-mine haulage and mining equipment.

A final objective is a system that can be implemented economically according to the above stated criteria. Therefore, according to these and other objectives, the preferred embodiment of the present invention consists of linking each autonomous vehicle and/or other moving equipment in a surface-mine facility to a control center for communicating data and control signals. The function of each autonomous vehicle is performed by causing it to track a predetermined trajectory related to its particular task and is implemented with on-board GPS and two-way communication hardware. In addition, the current position of the vehicle is continuously monitored and correlated to the position of potential hazards along its path, so that corrective action can be taken by implementing appropriate, predetermined control strategies.

According to one aspect of the invention, each vehicle is assigned a safety zone of operational occupancy (defined as a "safety envelope") that allows for the vehicle's actual physical presence and operating tolerances. The safety envelope is characteristic of each vehicle and is defined by a variable volume surrounding the vehicle wherein it may be physically present as it travels along its intended trajectory. According to another aspect of the invention, the shape and size of the safety envelope is dynamically varied to meet safety requirements for current trajectory conditions facing the vehicle as it performs its autonomous function along its predetermined path. The safety envelope is changed according to a predetermined set of rules specific to the vehicle. Thus, this zone of potential presence represents a volume of assumed occupancy under given conditions and is dynamically adjusted for each vehicle as circumstances change during the performance of its autonomous function.

According to yet another aspect of the invention, intersections and switch locations among the various predetermined paths and roadways available within the mine's property are identified dynamically by monitoring current traffic conditions and establishing locations where the safety envelopes of vehicles traveling along approaching trajectories could overlap. If an overlap of safety envelopes is possible, the trajectories are treated as merging or crossing, depending on their configuration, and the vehicles are controlled by a corresponding set of rules applicable to switches or intersections, as applicable. If an overlap is not possible even under worst-case conditions, the vehicles are not subjected to this additional layer of safety control.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

For the purposes of this disclosure, it is understood that every reference to a vehicle is intended to apply as well to any other movable piece of equipment that may be found in a surface mine or other facility employing autonomous vehicles. The term "trajectory" of a vehicle is intended to mean the predetermined path assigned to the vehicle so that it can perform its intended task. Accordingly, it refers to the linear set of x,y,z positions to be followed by a reference point on the vehicle as it travels between an origin and a destination. A trajectory, in a modified, expanded definition, may also refer to alternative path options within a corridor which may be allowed, instead of a single linear path, to achieve particular operational goals, such as the avoidance of rut formation and the like.

Successive trajectories may be combined to provide alternative options to various destinations. The term "intersection" refers to any location where the separate trajectories of different vehicles come close enough that their safety envelopes could overlap. The term "switch" refers to separate travel paths or routes in a facility that merge into a single path, or to a single path that splits into multiple ones; and the term "crossing" refers to separate paths that cross. Accordingly, switches and crossings are also referred to as intersections when they involve trajectories with potentially overlapping safety envelopes.

Figure 1:
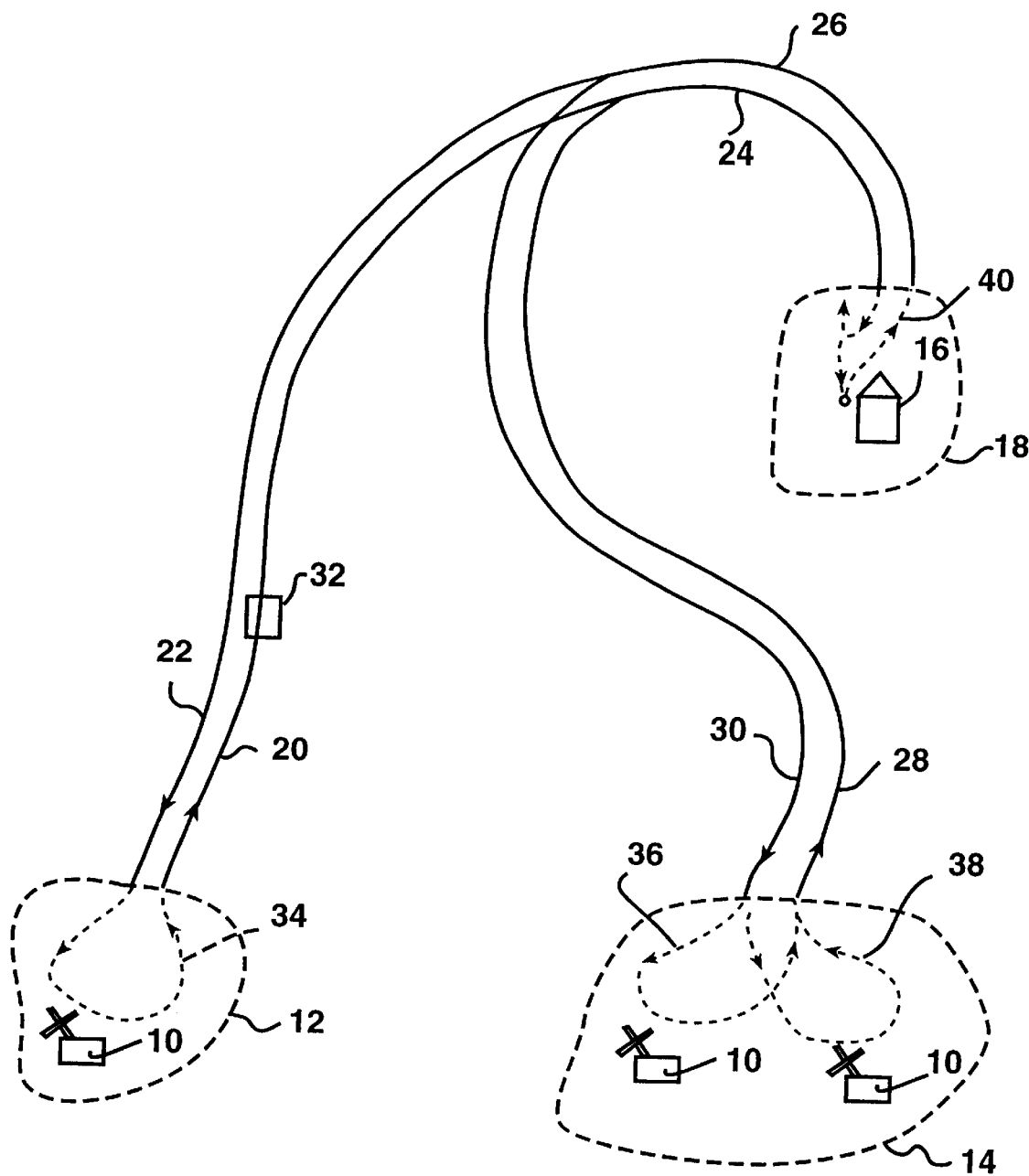
FIG. 1 illustrates in plan view a sample portion of a prior-art map of a surface mine property including routes between typical destination points.

Referring to the drawings, wherein like parts are designated throughout with like numerals and symbols, FIG. 1 illustrates in plan view a sample portion of a map of a surface mine property including exemplary routes between typical destination points.

Specifically, excavators 10 are illustrated as mining at two loading sites 12,14 which are connected to a crusher 16 at a site 18 through mine roadways associated with predetermined vehicle trajectories 20,22,24,26,28,30. Each trajectory represents a predetermined optimal travel path along which an autonomous vehicle 32, such as a haulage truck, is intended to be guided between end destinations (12,14,18) by an autonomous guidance system in order to effect a particular task. Additional alternative trajectories 34,36,38, 40 are provided within the sites 12,14,18 to control the approach and departure of the vehicle 32 to and from the excavators 10 and the crusher 16. In essence, based on current vehicle-position data generated by an on-board GPS or other equivalent positioning unit and using known feedback-control servo mechanisms, the mine's autonomous guidance system controls the motion of the vehicle 32 by performing steering, braking, acceleration, and other functions so as to closely track the trajectory of interest (i.e., the path of trajectory 20, in the case illustrated in the figure). Since present positioning'systems have accuracies of the order of a few centimeters, it is possible to obtain very close adherence to the target trajectory. To that end, the pertinent trajectory (selected from the applicable trajectories 20–30), or portion of a trajectory, currently being traveled by the vehicle 32 is stored in the controller's storage unit of the vehicle's microprocessor and used as a target trajectory by the guidance system. Note that these features of the invention are well known in the art and do not constitute its novel aspects.

Figure 2A:
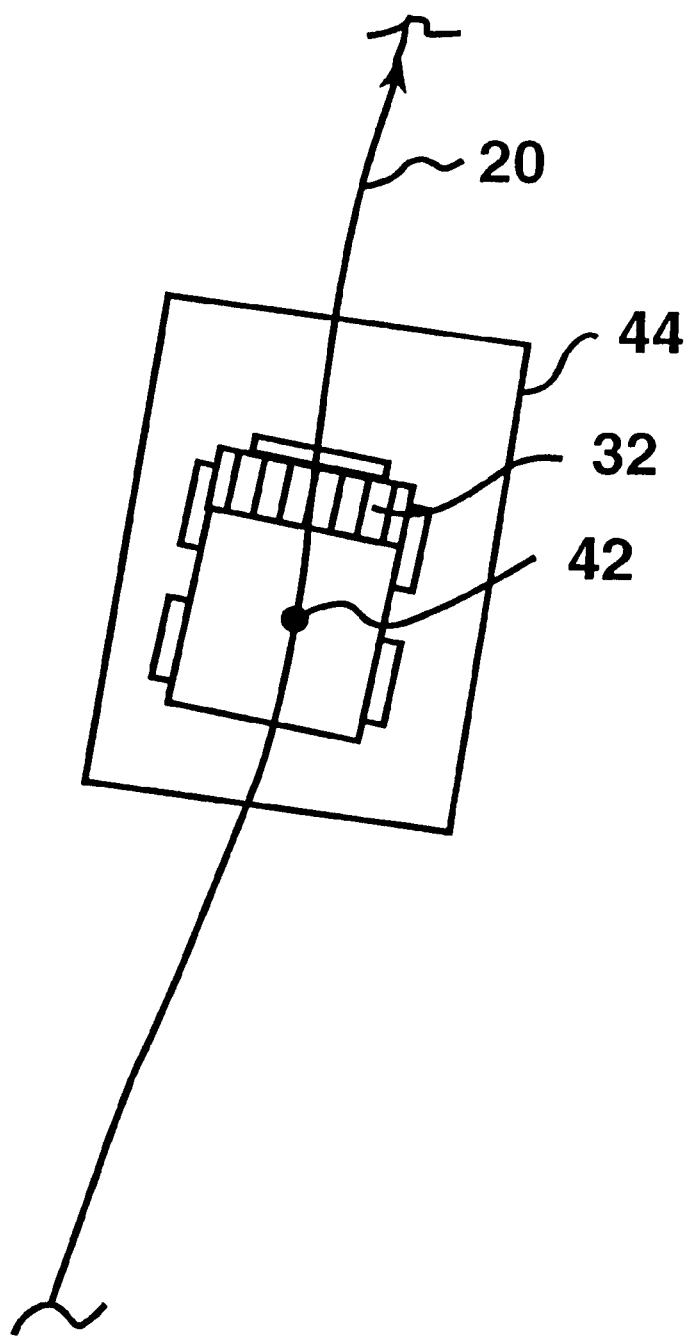
FIG. 2a illustrates schematically the selection of a reference point within a vehicle's physical structure to establish a nominal position for the vehicle within a selected coordinate system.
Figure 2B:
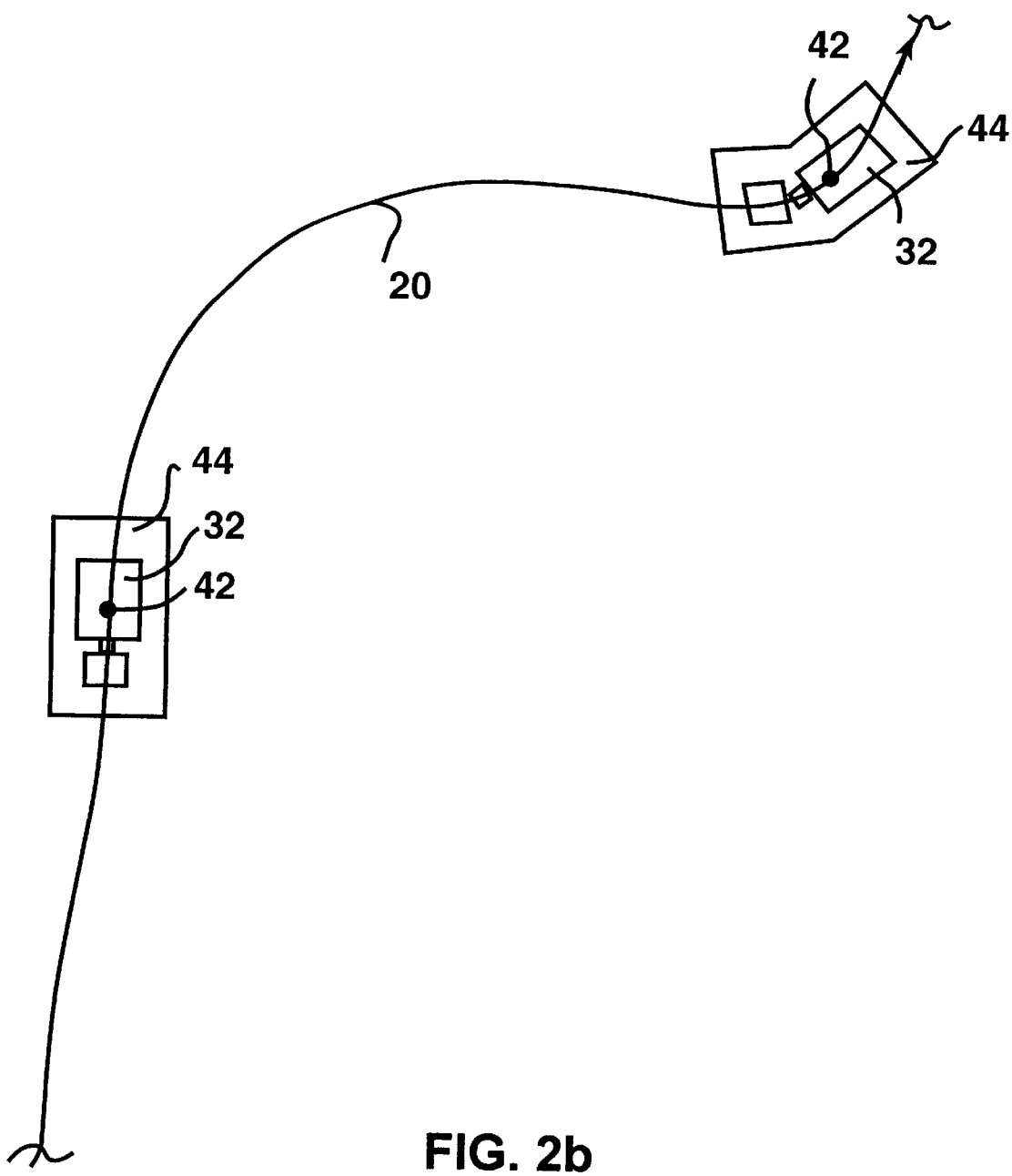
FIG. 2b illustrates schematically a vehicle consisting of two components connected by a swivel link and the corresponding safety envelopes for two different vehicle positions.

In practice, a nominal vehicle position within a selected coordinate system is chosen to correspond to the position of a reference point 42 within the vehicle's physical structure, such as its geometric center or the location of a communication antenna, as illustrated in FIG. 2a, and the guidance system is programmed to cause that particular point to track the desired trajectory (path 20 in FIG. 1, for example). Obviously, though, the physical dimensions of the vehicle 32 extend beyond the point 42 and a correspondingly larger clear path along the trajectory 20 must be present as the vehicle passes through in order to avoid collisions with nearby obstacles. For example, the length and width of the vehicle 32 define its minimum physical operating space required when the vehicle is at rest. As the vehicle moves along the trajectory 20 under the control of the autonomous guidance system, additional factors must be accounted for to ensure safety, such as steering error, navigational guidance margins, and stopping distance variations due to load, equipment condition, road surface and grade, etc. Thus, the actual physical space required by the vehicle 32 to ensure its safe operation is greater than its size. In addition, some vehicles include multiple components connected by swivel joints or other links that permit the deformation of the vehicle's overall geometry, as illustrated in FIG. 2b. These variables further contribute to the estimation of the space required by the vehicle to ensure its safe operation.

According to one aspect of this invention, the vehicle 32 is assigned a safety zone that allows for the vehicle's actual physical presence and for all pertinent operating tolerances, including planned operating deviations. This zone is defined by a variable safety envelope 44 around the autonomous vehicle 32 that is a function of the vehicle's physical configuration, which may vary in time, and its current position, speed, trajectory vector, guidance-system tolerances, and any other factor that may require a change in its operating space for safety purposes (collectively defined as a vehicle's "dynamic parameters" for the purposes of this disclosure). For example, the guidance system may provide for a modified, expanded trajectory (as defined above) consisting of parallel paths to be used alternatively in order to avoid rutting of the roadway. That is, the target position for the point 42 of the vehicle 32 may be shifted to the left or right of the trajectory 20 by a predetermined offset, thereby defining different space requirements and correspondingly an enlarged safety envelope 44. Therefore, the shape, size, and coordinate position within the mine of the envelope 44 surrounding the moving vehicle 32 is varied dynamically as the vehicle proceeds along the path 20 and as its operating parameters change. If the planned future location of the safety envelope 44 as the vehicle 32 (i.e., its nominal position indicator 42) travels along a first trajectory is predicted to overlap with the safety envelope of another vehicle traveling along another trajectory (either in parallel or in a switch or crossing), the two trajectories are automatically treated as intersecting and new safety controls are imposed on the guidance system.

Figure 3:
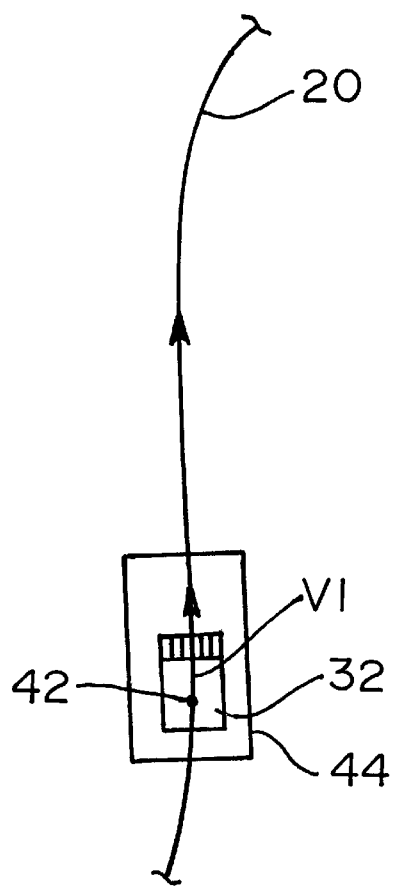
FIG. 3 illustrates the extended safety envelope for a vehicle traveling at a given speed, shown in vector form, corresponding to all locations where the vehicle may potentially be found as the guidance system controls its reference point to track a predetermined trajectory.
Figure 4:
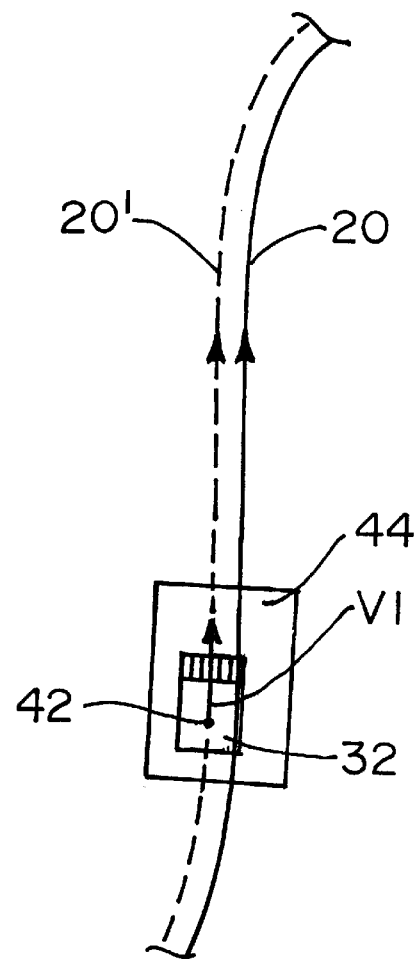
FIG. 4 illustrates the way the safety envelope may be enlarged to account for a shift to the left of the target path along a parallel trajectory purposely superimposed on the guidance control system in order to minimize rutting

Referring to FIG. 3, an extended safety envelope 44 for the vehicle 32 traveling at a given speed V1 (shown in vector form) is illustrated, corresponding to all locations where the vehicle 32 may potentially be found to be at the time when the guidance system controls its operating functions (steering, accelerator, etc.) to cause its reference point 42 to track the trajectory 20. The shape and size of the safety envelope is a function of the vehicle's speed, trajectory vector and other considerations. FIG. 4 illustrates the way the safety envelope 44 may be enlarged, for example, to account for a shift to the left of the target path 20 along a parallel trajectory 20' purposely superimposed on the guidance control system in order to minimize rutting, thereby causing the vehicle 32 to be guided along the modified trajectory defined by the corridor between the original trajectory 20 and the anti-rut trajectory 20'.

Figure 5:
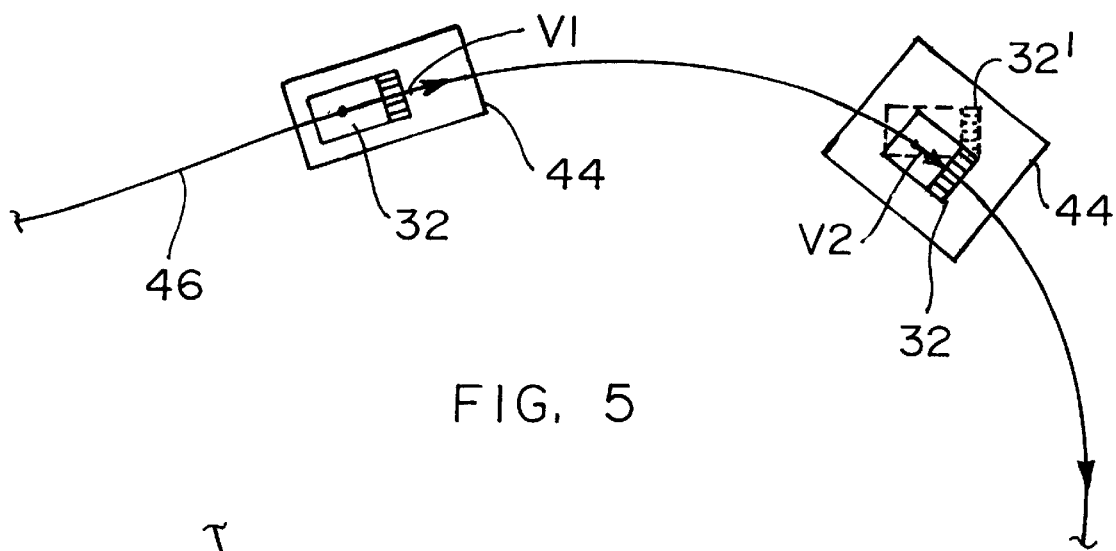
FIG. 5 illustrates how a further modified safety envelope can be used to account for all possible positions assumed by a vehicle as it makes a right turn along a given trajectory.

FIG. 5 illustrates how a further modified safety envelope 44 is used to also account for all possible positions that could be assumed by the vehicle 32 as it makes a right turn along a trajectory 46 traveling at a reduced speed V2 (numeral 32' is used to illustrate a worst-case scenario for the actual position of the vehicle 32 making a wide turn). As illustrated, as the vehicle is guided along its intended trajectory 46, a new safety envelope is continually assigned to it as a function of its intended position and speed along its path. The vehicle is allowed to continue in its travel without the imposition of further intersection controls so long as no potentially encroaching safety envelope of another vehicle is detected, as determined by appropriate on-board and/or central processing units tracking other moving vehicles within the mine property that may come within the future positions of the vehicle's safety envelope.

It is understood that the general concept of the invention can be implemented in various ways based on different design choices. For example, as a matter of system design, it may be desirable to select a target velocity profile associated with each vehicle trajectory in order to be able to forecast the safety envelope of the vehicle as it travels along the trajectory. An arbitrary criterion must be chosen to modify the safety envelope as a function of vehicle speed; for example, the size of the envelope might be extended (in any or all dimensions) as a linear function of vehicle velocity to account for the varied GPS-precision and control-error tolerances associated with different speeds. Also, the shape and the size of each safety envelope is related to the type of vehicle to which it is applied (a larger vehicle is obviously likely to occupy a larger area than a smaller vehicle). Similarly, when an approaching intersection location is identified based on potentially overlapping safety envelopes between approaching vehicles, a specific control protocol must be implemented. For example, one vehicle may be stopped or slowed down before the intersection location, while the other is allowed to continue uninterrupted, according to a predetermined logic of operational preferences (e.g., loaded trucks may have precedence).

Figure 6:
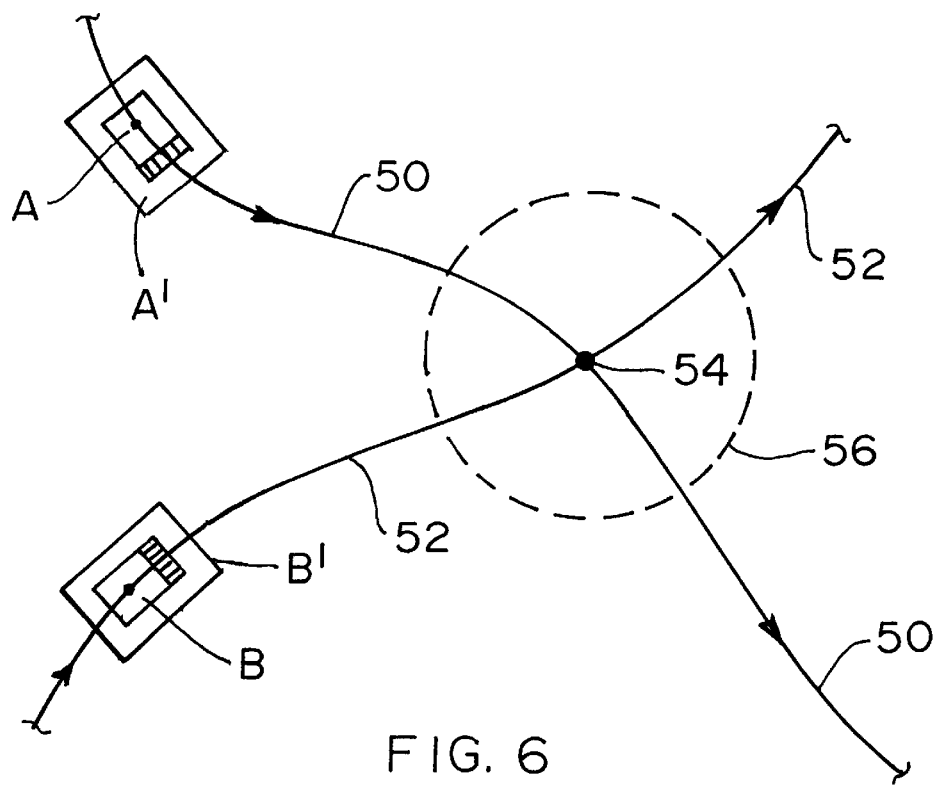
FIG. 6 shows two vehicles A and B traveling with safety envelopes A' and B', respectively, on different intersecting roadways that approach one another along corresponding trajectories defining a crossing point identified as an intersection with a corresponding zone within which only one vehicle at a time is allowed.
Figure 7:
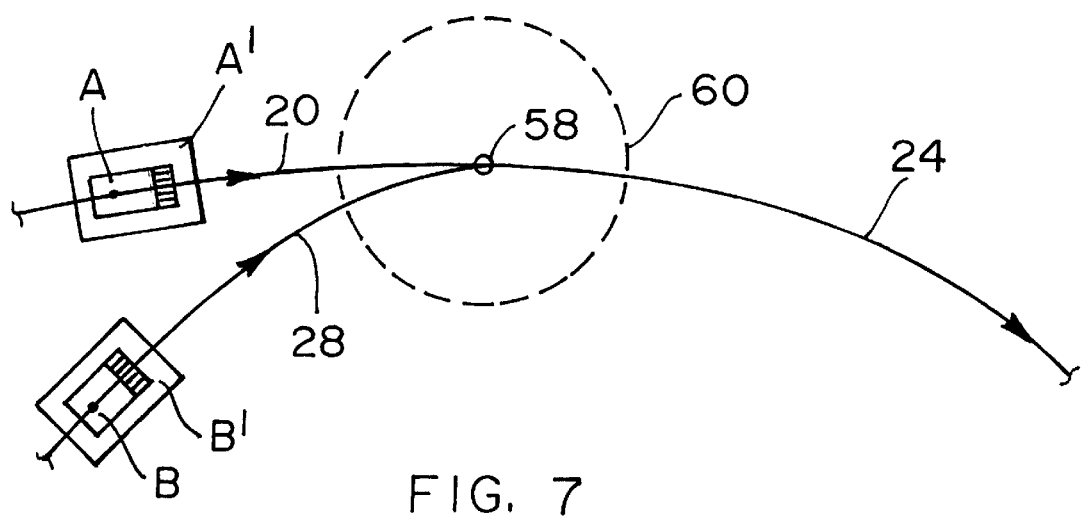
FIG. 7 illustrates two vehicles A and B traveling with safety envelopes A' and B', respectively, on different roadways that merge into a single one along corresponding trajectories, wherein the merging point is identified as a switch with a corresponding zone within which only one vehicle is allowed at any given time.
Figure 8:
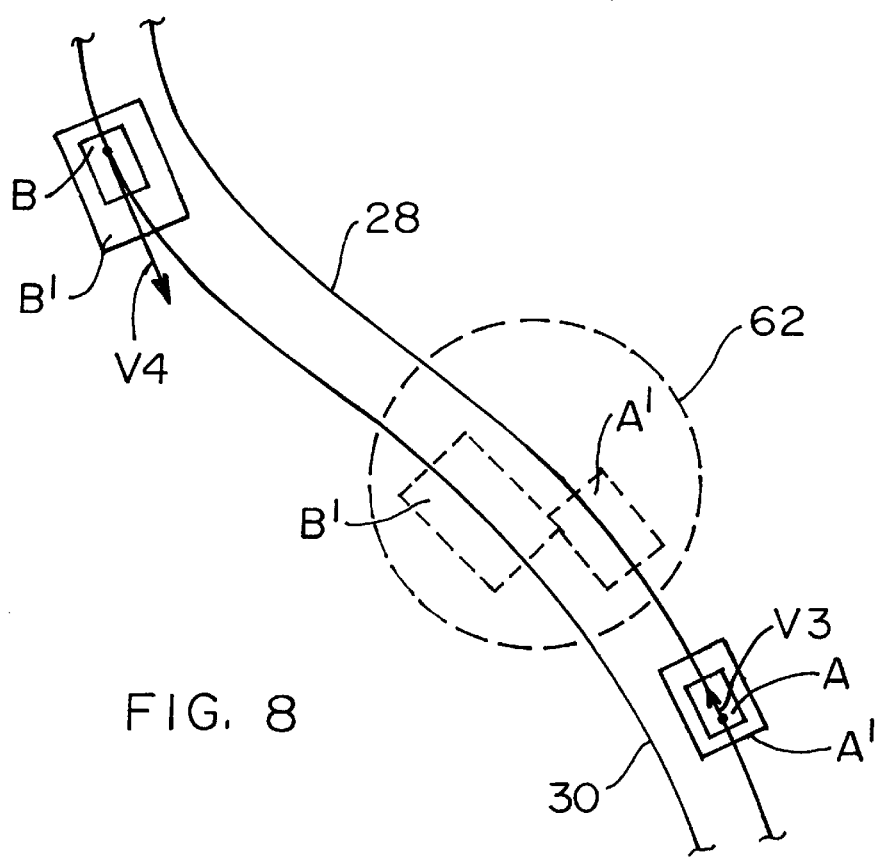
FIG. 8 shows the application of the concept of the invention for ensuring the safety of two vehicles A and B approaching one another while traveling in opposite directions along parallel trajectories on a single roadway.

The invention is based on the idea of providing each moving vehicle with a zone of occupancy dedicated to the vehicle, so that the autonomous functions of the vehicle can proceed as programmed without interference by the guidance system for safety considerations so long as this zone is not seen as potentially overlapping with the corresponding zone of another vehicle. In essence, these safety envelopes constitute a part of the guidance protocol by which safety at switch points, crossings, and parallel paths is monitored and implemented in the autonomous guidance system. Its specific implementation requires the development of a safety-envelope function for each vehicle in the system, wherein a space is allocated as a function of vehicle characteristics, speed, system tolerances, and any other variable deemed appropriate for the application. This function, which at all times specifies a space around the vehicle to which it corresponds, is defined in terms of coordinates relative to the vehicle, so that its coordinates relative to the mine vary as the vehicle travels within the mine. For example, a simple safety-envelope function could be defined by a two-dimensional figure based on coordinates having origin at the point 42 within the vehicle. As the vehicle 32 is projected to move a given distance within a mine coordinate system, the point 42 also moves and with it so does the figure corresponding to the projected position of the vehicle's safety envelope. Thus, inasmuch as the envelope changes as a function of various parameters, it represents a dynamic quantity for each vehicle in the mine's autonomous guidance system. The area mapped by superimposing over a given vehicle's trajectory the predicted sequential positions of the safety envelope of the vehicle as it is guided to track that trajectory defines the virtual space expected to become occupied by the vehicle. Accordingly, the vehicle's travel trajectory and speed profile are released for implementation by the guidance system only if no overlap is predicted within a predetermined distance (or period of time) with the area mapped by the safety envelope of another vehicle, Since each autonomous vehicle in the system is necessarily equipped with a two-way communication unit, each vehicle is linked to every other vehicle in the system, either directly or through a central location. Accordingly, if each vehicle periodically broadcasts its position and safety-envelope function, the on-board data processor of each vehicle can monitor every other vehicle and ensure that intersecting trajectories, as defined herein, are identified and that traffic flow is controlled to prevent the encroachment of any obstacle with the safety envelope of all traveling vehicles. When two vehicles A and B traveling with safety envelopes A' and B' on separate crossing roadways approach one another along corresponding trajectories 50 and 52, such as shown in FIG. 6, the crossing point 54 is identified as an intersection with a corresponding zone 56 within which only one vehicle at a time is allowed. For example, vehicle A may be directed to stop outside the zone 56 while vehicle B is allowed to go through according to a predetermined priority schedule (for example, a loaded truck may have priority over an empty one, or vice versa). Similarly, when two vehicles A and B traveling with safety envelopes A' and B' on different roadways and along separate trajectories 20 and 28 merge into a single trajectories 24, as shown in FIG. 7, the switch point 58 is identified as an intersection with a corresponding zone 60 within which only one vehicle is allowed at any given time. The concept of the invention also provides an equivalent mechanism for ensuring the safety of two vehicles A and B approaching one another while traveling in opposite directions along parallel trajectories 28 and 30 on a single roadway, such as shown in FIG. 8. Using their safety envelopes A' and B' (shown of different dimensions to reflect different travel speeds) to predict whether or not they could encroach (as illustrated in phantom line) when the vehicles pass by one another at a location predicted to fall within a given zone 62, one vehicle may be directed to stop on the side of the roadway and let the other go by according to a predetermined priority schedule (for example, again, a truck going to the crusher 16 may have priority over one returning to a loading site 14). It is noted that a parked truck should have a safety envelope corresponding substantially to its physical dimensions, thereby becoming a fixed obstacle that would not produce the existence of an intersection with its attendant imposition of additional safety controls so long at it is placed outside the expected corridor traveled by the moving vehicle's envelope.

In essence, the novel concept of the invention resides in the idea of allocating a variable space to each vehicle operating in an autonomous system (including manned vehicles, so that they can be properly accounted for by the system). Such space is considered to correspond to the volume possibly occupied by the vehicle at any given time. The space is changed dynamically as a function of preselected parameters (such as vehicle's geometry, speed, and guidance-control errors and/or tolerances) that reflect the uncertainty regarding the precise location of the vehicle with respect to a nominal target position. The invention also resides in using the safety-envelope concept to determine whether or not the predetermined trajectories of traveling vehicles should be treated as intersecting, thereby triggering additional control constraints to avoid potential collisions and ensure safety.

Figure 9:
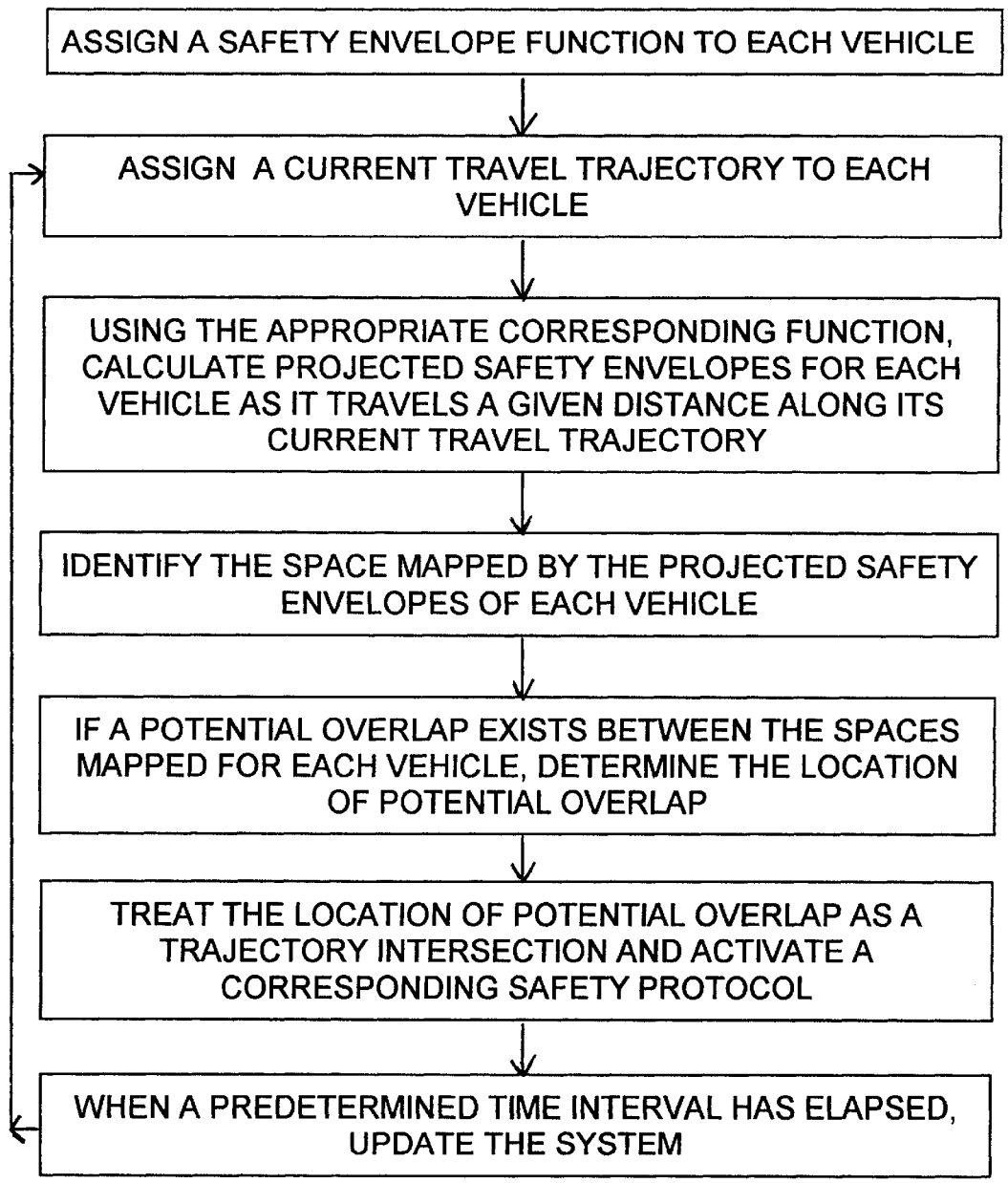
FIG. 9 is a flow chart showing the steps of the invention.

The invention is one of several features of a collision avoidance system applied to a guidance system for autonomous vehicles in a surface operation that may also include manned vehicles. The guidance system and other components of the collision avoidance approach are not part of this invention and, therefore, are not described here. In practice, the invention can be implemented within an existing autonomous system as follows. As illustrated in the flow chart of FIG. 9, each vehicle in the system (whether autonomous or manned) is assigned a safety-envelope function $f(s,v,p_1,p_2, \ldots )$; where s is a variable defining the vehicle's physical size and shape; v is its speed; and $p_1$, $p_2$,etc. are parameters related to the vehicle's direction and turning radius, to positioning and control tolerances, and to other quantifiable potential system errors. As the vehicle is guided along a predetermined trajectory, the space mapped by its safety envelope moving along the trajectory is calculated using the safety-envelope function and looking ahead a given distance considered safe for effecting emergency collision-avoidance maneuvers. The same step is performed for any other vehicle traveling within a predetermined distance of the first vehicle. If any overlap is predicted between the spaces mapped by the sequential positions expected to be occupied by the safety envelopes of two approaching vehicles, an intersection in the corresponding trajectories is established and a collision avoidance protocol is activated by the vehicle guidance system. The system is updated periodically as the vehicles travel to reflect new trajectories assigned to each vehicle; changed circumstances in the mine that may be reflected, for example, in changed velocity profiles and/or changed priority protocols; and new potential overlaps among vehicles' safety envelopes. Accordingly, the approach provides a dynamic way to continuously determine whether each vehicle should be allowed to proceed according to the trajectory pre-assigned by the guidance system or whether an additional layer of safety is required to prevent collisions.

Figure 10:
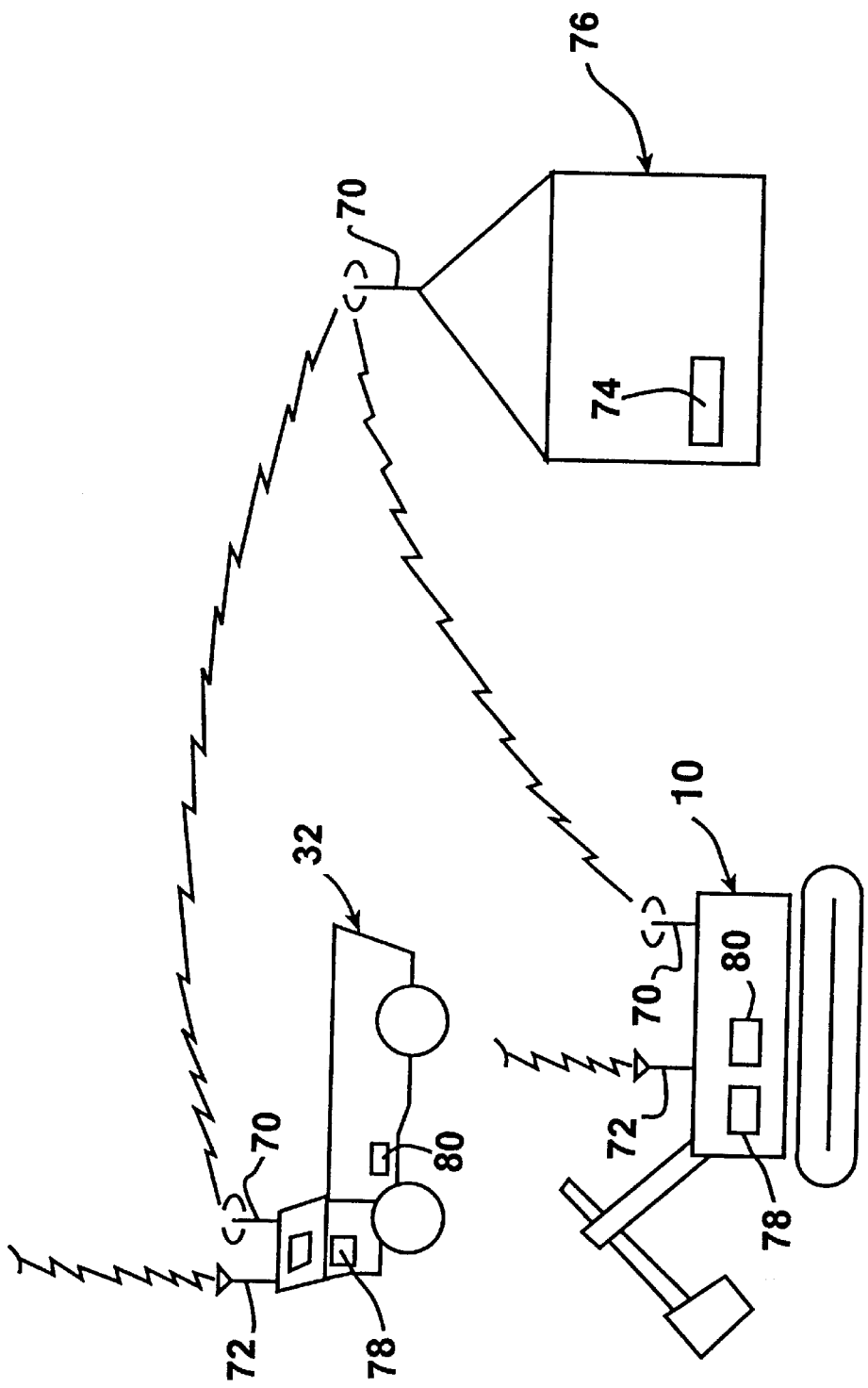
FIG. 10 is a schematic illustration of the apparatus required to implement the invention.

FIG. 10 is a schematic illustration of the apparatus required to implement this dynamic safety-envelope system for autonomous-vehicle traffic control according to the invention. Each excavator 10 and haulage vehicle 32 within the system is equipped with two-way communication apparatus 70 and with a positioning system unit 72 (such as a GPS unit). Mine roadway maps and vehicle trajectories, as well as appropriate software to implement the various functions required for the invention, are stored in digital form in a computer 74 (or, equivalently, in a unit of a computer network) housed in a base station 76 which is also equipped with two-way communication apparatus 70. Thus, the precise location of the vehicle 32 can be determined periodically, using its positioning system unit and an on-board processor 78 (with appropriate hardware, software and control modules 80), and communicated to the computer 74 at the base station together with identifying information regarding the particular vehicle 32 being guided. Upon processing of this information, the computer 74 transmits the appropriate set of instructions to the on-board processor 78 to guide the vehicle to the intended destination using appropriate hardware and guidance software incorporated within the vehicle. The control mechanisms and related processing hardware and software required to implement the various steps of the invention are well known in the art.

Various changes in the details, steps and components that have been described may be made by those skilled in the art within the principles and scope of the invention herein illustrated and defined in the appended claims. For example, the invention has been illustrated, and for simplicity it is currently preferably implemented, in terms of two-dimensional safety envelopes, but the concept would apply in equivalent fashion to a three-dimensional implementation. In practice, the approximation introduced by a 2-D model does not affect the system sufficiently to warrant the additional complication of a 3-D model, although the latter could be implemented successfully with modern positioning systems. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and procedures.

I claim:

1. In an autonomous vehicle system wherein traffic control apparatus guides at least one of a plurality of vehicles moving along corresponding travel trajectories, a method for imposing predetermined constraints on said at least one of the plurality of vehicles in order to prevent collisions among the vehicles, the method comprising the following steps:

(a) assigning a safety envelope to said plurality of vehicles in the system;
    (b) predicting a position of the safety envelope as each vehicle travels along a trajectory; and
    (c) imposing a selected safety constraint on said at least one of the vehicles when a potential overlap of safety envelopes of two or more vehicles is identified.

2. The method of claim 1, wherein said safety envelope is variable as a function of vehicle dynamic parameters.

3. The method of claim 1, wherein said safety envelope is variable as a function of vehicle dimensions.

4. The method of claim 1, wherein said step (c) is carried out by treating said potential overlap as an intersection between trajectories assigned to said two or more vehicles.

5. The method of claim 4, wherein said safety envelope is variable as a function of vehicle dynamic parameters.

6. The method of claim 4, wherein said safety envelope is variable as a function of vehicle dimensions.

7. The method of claim 1, wherein steps (b) and (c) are repeated periodically to update each vehicle's safety constraints along the vehicle's travel trajectory.

8. The method of claim 7, wherein said safety envelope is variable as a function of vehicle dynamic parameters.

9. The method of claim 7, wherein said safety envelope is variable as a function of vehicle dimensions.

10. The method of claim 4, wherein steps (b) and (c) are repeated periodically to update each vehicle's safety constraints along the vehicle's travel trajectory.

11. The method of claim 10, wherein said safety envelope is variable as a function of vehicle dynamic parameters.

12. The method of claim 10, wherein said safety envelope is variable as a function of vehicle dimensions.

13. The method of claim 1, wherein said autonomous vehicle system is implemented in a surface mine.

14. In an autonomous vehicle system wherein traffic control apparatus guides at least one of a plurality of vehicles moving along corresponding travel trajectories, apparatus for imposing predetermined constraints on said at least one of the plurality of vehicles for preventing collisions among the vehicles, comprising the following combination of components:

(a) means for assigning a safety envelope to said plurality of vehicles in the system;
    (b) means for predicting a position of the safety envelope as each vehicle travels along a trajectory;
    (c) means for identifying a potential overlap of safety envelopes of two or more vehicles; and
    (d) means for imposing a selected safety constraint on said at least one of the vehicles when said potential overlap is identified.

15. The apparatus of claim 14, wherein said safety envelope is variable as a function of vehicle dynamic parameters.

16. The apparatus of claim 14, wherein said safety envelope is variable as a function of vehicle dimensions.

17. The apparatus of claim 14, wherein said means for imposing a selected safety constraint on said at least one of the vehicles when said potential overlap is identified includes means for treating said potential overlap as an intersection between trajectories assigned to said two or more vehicles.

18. The apparatus of claim 17, wherein said safety envelope is variable as a function of vehicle dynamic parameters.

19. The apparatus of claim 17, wherein said safety envelope is variable as a function of vehicle dimensions.

20. The apparatus of claim 14, further including means for periodically predicting the position of the safety envelope as the vehicle travels along a predetermined trajectory, identi fying a potential overlap of safety envelopes of two or more vehicles, and imposing a selected safety constraint on said at least one of the vehicles when said potential overlap is identified.

21. The apparatus of claim 20, wherein said safety envelope is variable as a function of vehicle dynamic parameters.

22. The apparatus of claim 20, wherein said safety envelope is variable as a function of vehicle dimensions.

23. The apparatus of claim 17, further including means for periodically predicting the position of the safety envelope as the vehicle travels along a predetermined trajectory, identifying a potential overlap of safety envelopes of two or more vehicles, and imposing a selected safety constraint on said at least one of the vehicles when said potential overlap is identified.

24. The apparatus of claim 23, wherein said safety envelope is variable as a function of vehicle dynamic parameters.

25. The apparatus of claim 23, wherein said safety envelope is variable as a function of vehicle dimensions.

26. The apparatus of claim 14, wherein said autonomous vehicle system is implemented in a surface mine.

* * * * *